J. A. ADAMS.
COMBINED AUTOMATIC AND STRAIGHT AIR VALVE MECHANISM.
APPLICATION FILED MAY 15, 1916.
1,262,900.
Patented Apr. 16, 1918.
3 SHEETS—SHEET 1.
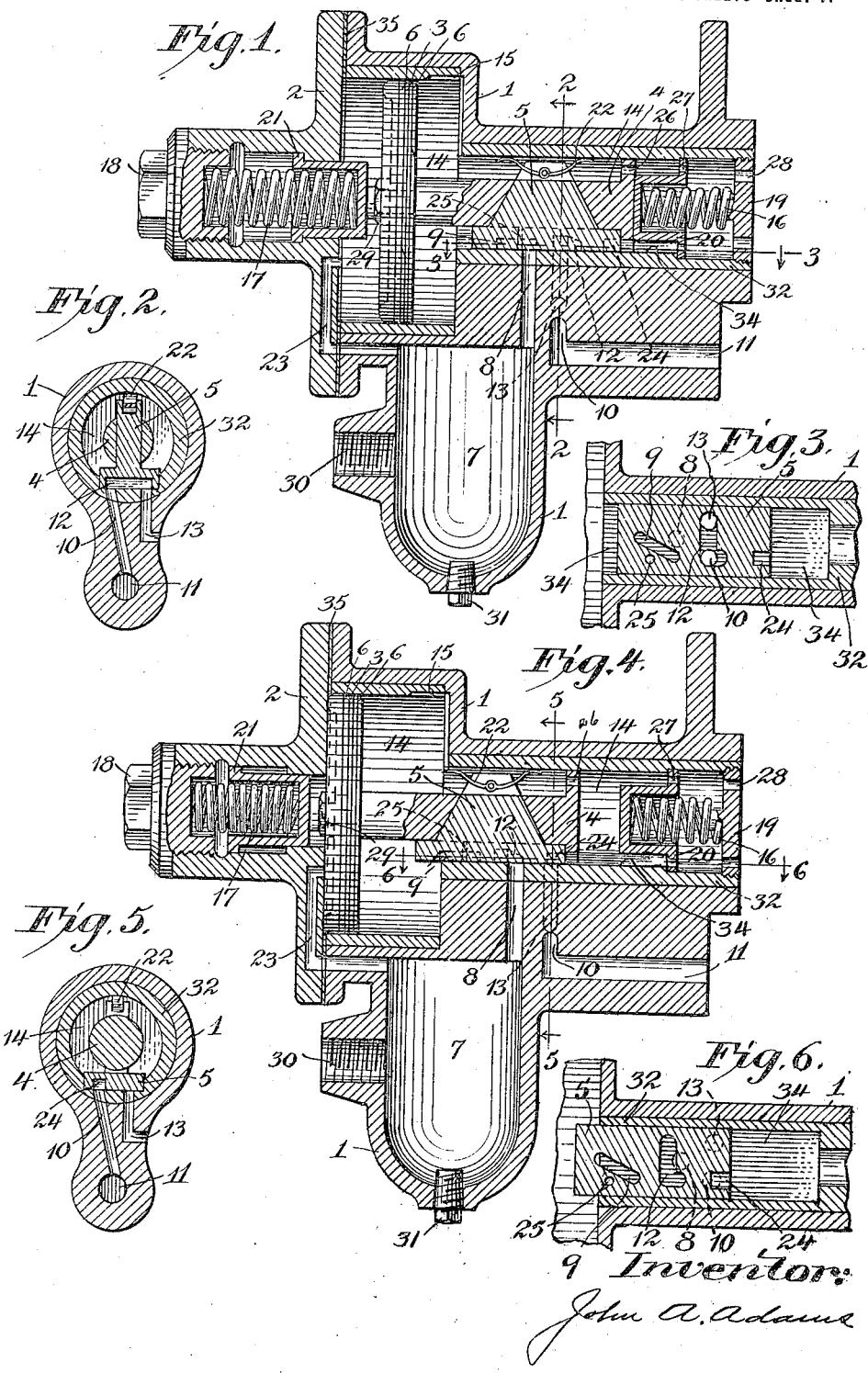

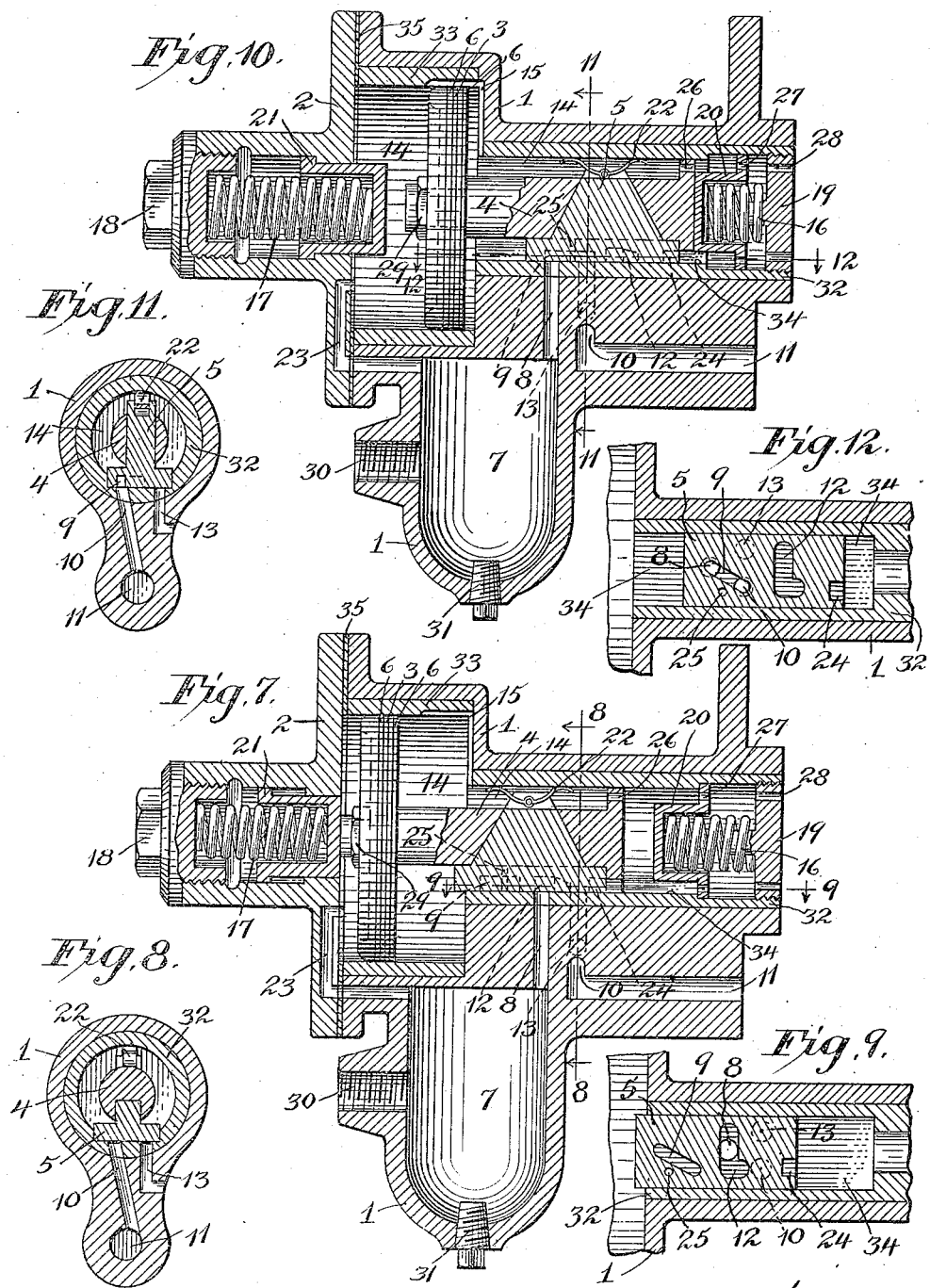

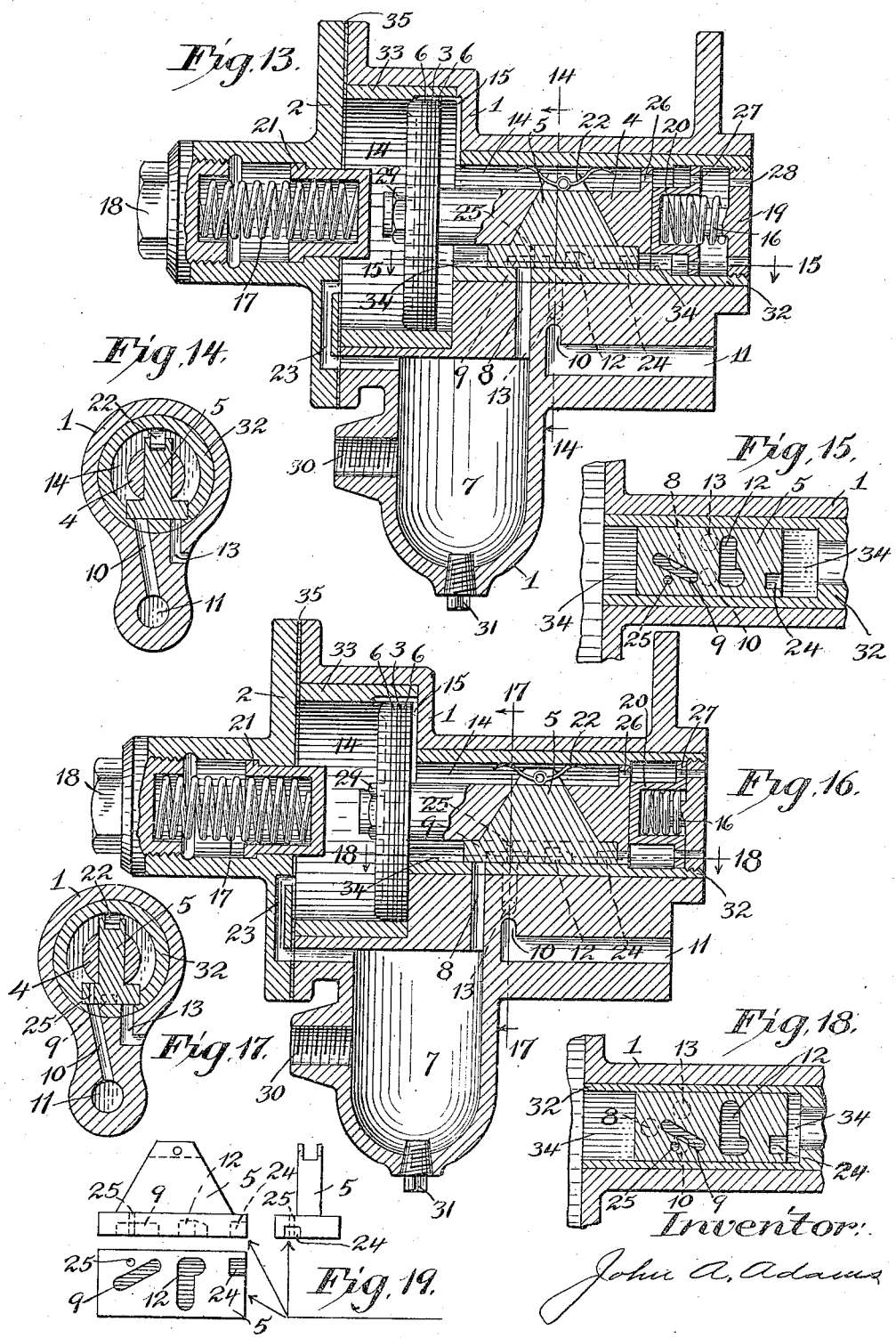

UNITED STATES PATENT OFFICE.

JOHN A. ADAMS, OF NOGALES, ARIZONA, ASSIGNOR TO UNIVERSAL AIR BRAKE COMPANY, A CORPORATION OF DELAWARE.

COMBINED AUTOMATIC AND STRAIGHT AIR VALVE MECHANISM.

1,262,900. Specification of Letters Patent. Patented Apr. 16, 1918.

Application filed May 15, 1916. Serial No. 97,623.

*To all whom it may concern:*

Be it known that I, JOHN A. ADAMS, a citizen of the United States, residing at Nogales, in the county of Santa Cruz and State of Arizona, have invented new and useful Improvements in Combined Automatic and Straight Air Valve Mechanism, of which the following is a specification.

This invention relates in general to fluid pressure brakes, such as are usually operated by compressed air and more especially to a combined automatic and straight-air brake controlling valve, designed for use on locomotives and cars, and adapted to be operated either automatically by reduction in the train brake pipe pressure and using the auxiliary reservoir reserve air pressure in the usual way, or by increasing the normal train brake pipe pressure and using direct air pressure from the main reservoir on the locomotive to the brake cylinders, and it consists in the combinations, constructions and arrangements herein described and claimed.

One of the objects of my invention is to provide an improved combined automatic and straight-air valve mechanism for applying the brakes, either by reducing or increasing the normal train brake pipe pressure through the manipulation of the engineer's brake valve.

Another object of my invention is to provide an improved apparatus of the type described, whereby the brakes may be applied and released or controlled at will, either by the use of automatic or straight air, regardless of the weight or tonnage of the train or the different train brake pipe pressures.

Other objects and advantages will appear in the following specification and the novel features of the device will be pointed out in the appended claim.

My invention is illustrated in the accompanying drawings, forming part of this specification, in which similar characters of reference indicate corresponding parts in all the views.

Figure 1 is a view showing the central vertical section through the device in release position.

Fig. 2 is a cross section view along the line 2—2 of Fig. 1.

Fig. 3 is a diagram showing the relative position of ports and passages along the line 3—3 of Fig. 1.

Fig. 4 is a view showing the central vertical section through the device in automatic emergency position.

Fig. 5 is a cross section view along the line 5—5 of Fig. 4.

Fig. 6 is a diagram showing the relative position of ports and passages along the line 6—6 of Fig. 4.

Fig. 7 is a view showing the central vertical section through the device in automatic lap position.

Fig. 8 is a cross section view along the line 8—8 of Fig. 7.

Fig. 9 is a diagram showing the relative position of ports and passages along the line 9—9 of Fig. 7.

Fig. 10 is a view showing the central vertical section through the device in position for making a straight air brake application.

Fig. 11 is a cross section view along the line 11—11 of Fig. 10.

Fig. 12 is a diagram showing the relative position of ports and passages along the line 12—12 of Fig. 10.

Fig. 13 is a view showing the central vertical section through the device in lap position after making a straight air application of the brakes.

Fig. 14 is a cross section view along the line 14—14 of Fig. 13.

Fig. 15 is a diagram showing the relative position of ports and passages along the line 15—15 of Fig. 13.

Fig. 16 is a view showing the central vertical section through the device restricting the flow of increased train pipe pressure to the brake cylinder.

Fig. 17 is a cross section view along the line 17—17 of Fig. 16.

Fig. 18 is a diagram showing the relative position of ports and passages along the line 18—18 of Fig. 16.

Fig. 19 is a bottom plan view of the slide valve showing end and side elevations.

In the following specification I will describe completely the novel combined automatic and straight air valve mechanism and the operation thereof, and only so much of the ordinary air brake mechanism which coöperates therewith as will be sufficient for a clear understanding of the use and operation of my invention.

In carrying out my invention I provide a valve casing 1 of suitable shape. In the present instance I have shown this as a cylinder provided with a cap 2 which may be secured to the body portion 1 in any suitable manner.

Within the interior of valve casing 1 is a piston valve 3 designed to operate the piston valve rod 4 which controls the slide valve 5. Packing rings 6 are provided for the piston valve. The slide valve 5 is designed to control the air pressure flowing from the train brake pipe to the brake cylinder through cavity 7 port 8 passage 9 port 10 and passage 11 leading to the brake cylinder and also controls a restricted flow of air pressure from cavity 7 through port 23 feed groove 15 port 25 to port 10 and passage 11 leading to the brake cylinder when an increase in the train line pressure is made for a straight air application of the brakes. At 13 is shown an exhaust port normally open but adapted to be closed by either an increase or reduction of air pressure in the train brake pipe. A feed groove 15 in the piston cylinder chamber casing around piston 3 is provided to keep the auxiliary reservoir charged.

At 16 and 17 are shown two springs, which are provided for the purpose of moving the piston valve 3 to its normal position when the train brake pipe and auxiliary reservoir air pressures have equalized. Backing plugs 18 and 19 are provided to hold the springs 16 and 17 in position. At 20 and 21 are shown two bushings, which are provided for the purpose of limiting the movement of the springs 16 and 17. At 22 is shown a slide valve spring which keeps the slide valve properly seated. Passage 23 is provided for the purpose of allowing the air pressure coming from the train brake pipe through connection 30 and cavity 7 to pass into the piston valve cylinder chamber 14. At 12 is shown a crossover passage in the slide valve designed to relieve the train line pressure and control the exhaust port. At 24 is shown a port connecting the auxiliary reservoir air pressure with port 10 and passage 11 leading to the brake cylinder when a reduction in the train brake pipe pressure is made for an automatic application of the brakes. Passages 26—27 and 28 are provided to allow the air pressure coming through feed groove 15 to pass to the auxiliary reservoir.

From the foregoing description of the various parts of the device, the operation thereof may be readily understood.

To make an automatic service or emergency brake application with my combined automatic and straight air valve, the engineer makes a reduction in the normal train brake pipe air pressure in the usual way through the engineer's valve, this permits the release of air from the train line side of the piston valve chamber through passage 23 and cavity 7, while this movement is taking effect the passage 12 temporarily opens communication between cavity 7 and the brake cylinder through port 8 passage 12 and port 10, the auxiliary reservoir air pressure then forces the piston valve 3 to move in the direction of spring 17, the slide valve 5 then covers the exhaust port 13 and uncovers the port 10 through passage 24, the auxiliary reservoir air pressure then flows through passage 11 direct to the brake cylinder which makes an automatic application of the brakes, the force of the application being governed by the amount of reduction of air pressure made through the engineer's brake valve.

To release the automatic application of the brakes, the engineer recharges the train brake pipe, which forces the piston to uncover the feed groove 15 which allows the air to pass through the passages 26—27 and 28 to the auxiliary reservoir. When the normal train brake pipe pressure is again equalized on both sides of the piston valve 3 the spring 16 forces it to its normal position and the slide valve passage 12 uncovers the port 10 and the exhaust port 13 releasing the air from the brake cylinder to the atmosphere, thus releasing the brakes.

To make a straight air service or emergency brake application with my combined automatic and straight air valve, the engineer increases the normal train brake pipe pressure, cavity 7 being connected directly to the train brake pipe, air passes from the train brake pipe through cavity 7 and passage 23 into the piston valve chamber 14, where it forces the piston valve 3 to move the slide valve 5 covering the exhaust port 13 and uncovering the port 10 which permits direct air pressure to flow from cavity 7 through port 8 passage 9 in the slide valve and on through port 10 and passage 11 direct to the brake cylinder, thereby setting or applying the brakes, the position of the valve at this time being shown in Fig. 10. Should a heavy increase in train line pressure be made and held on account of having a long train this further increase would cause the valve to move to its extreme forward position as shown in Fig. 16, thus restricting the flow of the increased pressure through the forward valves and allow an equal distribution of air pressure, at this time the air would pass into the brake cylinder through the feed groove 15 port 25 port 10 and on to the brake cylinder.

The amount of increased air pressure added to the normal train brake pipe pressure as above described, to set the brakes with my improved automatic and straight air valve, also keeps the auxiliary reservoirs charged through feed groove 15. The port 25 is arranged in the slide valve 5 to gradually increase the brake cylinder pressure while the volume of increased pressure applied to the normal train line pressure is equalizing itself between the first and last cars of the train, and also prevents an excess of air pressure accumulating in the auxiliary reservoirs when making a straight air brake application, and is covered when the air pressure equalizes on both sides of the piston valve 3, the spring 16 moving the valve to its normal position covers the port 8 and uncovers the exhaust port 13 in the valve casing, which permits the release of the air from the brake cylinder to the atmosphere through passage 11, port 10, passage 12 in the slide valve and exhaust port 13 when the train brake pipe pressure is reduced to normal through the engineer's valve, thus releasing the brakes.

It will thus be seen that the force of the application depends entirely on the amount of increased air pressure which the engineer adds to the normal train brake pipe pressure, as he has complete control and can make either an automatic or straight air application of the brakes at will, by the use of the engineer's brake valve on the engine. By the use of my valve it is impossible to lose the braking power, since any position, other than running or lap position of the engineer's brake valve will apply the brakes.

By the use of my valve, the brakes can be applied by both the use of straight air and automatic air. Straight air can be applied to the brakes as shown in Fig. 10 and automatic air can be applied on top as shown in Fig. 4, or automatic air can be applied to the brakes and straight air can be applied on top, but with my valve it is better to use straight air in all cases, thereby having the automatic air in reserve in case of accidents, such as the parting of a hose connection, or the breaking of a train brake pipe. As is clearly seen, the auxiliary reservoir is kept charged by the use of my valve.

By the use of my valve using straight air the pressure in each brake cylinder will be the same for the reason that the increased air pressure applied to the normal train brake pipe pressure at the engine is equally distributed to the brake cylinders. This prevents to a large extent, the bunching of cars and breaking in two of the train, as is now very often the case with the present system of automatic air brakes. My valve will act perfectly, regardless of the weight or tonnage of a car or the different train brake pipe pressures, and permits of a gradual control by using either automatic or straight air for a brake application.

In making a straight air service brake application with my valve, the engineer governs the force of the application by the manipulation of the engineer's brake valve, by increasing the normal train brake pipe pressure, this pressure is retained in the brake cylinder by the valve moving automatically to lap position as shown in Fig. 13, this takes place after the increased air pressure applied to the normal train brake pipe pressure has expanded into the brake cylinder, the train brake pipe pressure is then slightly above that of the auxiliary reservoir. Should the engineer find that the train is not under control, he can further increase the braking power to any degree required by making further applications and graduate the same at will, should he find that he has made a too severe application of the brakes, he can moderate the overcharge to any pressure desired, without going into full release and so graduate the same, until the normal train brake pipe pressure is reached, when the brakes will release.

In making an automatic service brake application with my valve, the engineer governs the force of the application by the manipulation of the engineer's brake valve, by reducing the normal train brake pipe pressure and can retain the amount of air pressure applied to the brake cylinder. When a given reduction is made for an automatic application of the brakes, the slide valve 5 covers the exhaust port 13 and temporarily forms communication between cavity 7 and the brake cylinder through port 8, passage 12 in the slide valve, port 10 and passage 11, which relieves the train brake pipe pressure and causes the valve parts to move more uniform and makes a simultaneous brake application throughout the train. After the auxiliaries have expanded the air pressure into the brake cylinders until the pressure is slightly above that of the train line, the valve parts will then move automatically to lap position as shown in Fig. 7 and retain the amount of air pressure in the brake cylinders. These applications may be repeated and graduated at will, until the auxiliaries have equalized with the brake cylinder air pressures, should the engineer then find that the train was not under control and he had exhausted the auxiliary reservoir reserve air pressure, he could then move the engineer's valve to full release and thus supplement the automatic brake application by moving the triple valves to position shown in Fig. 16 and recharge the auxiliaries at the same time.

Having now described my invention, what I claim as new and desire to secure by Letters Patent is:—

In an air brake system, the combination with a train pipe, auxiliary reservoir and brake cylinder, of a triple valve connected to the train pipe, auxiliary reservoir, brake cylinder and atmosphere, a port connecting the valve chamber with the train pipe, single port connecting the valve chamber with the brake cylinder, a passage in the slide valve establishing communication between the train pipe and brake cylinder when an increase in the train pipe normal pressure is made for a straight air application of the brakes, another passage in the slide valve establishing communication between the auxiliary reservoir and brake cylinder when a reduction is made in the normal train pipe pressure, a port through the slide valve normally closed and adapted to uncover the port connecting the valve chamber with the brake cylinder when the train pipe pressure is increased and means for establishing communication between the auxiliary reservoir and train pipe through the piston chamber.

In testimony whereof I affix my signature in the presence of two witnesses.

JOHN A. ADAMS.

Witnesses:
W. E. POMEROY,
W. K. BURNS.

Copies of this patent may be obtained for five cents each, by addressing the "Commissioner of Patents, Washington, D. C."